June 24, 1969 J. E. WARD 3,452,162

CIRCUIT FOR PROVIDING A FILTERED DC POTENTIAL AND AN ACTUATING PULSE FOR AN ELECTROMAGNETIC DEVICE

Filed June 15, 1967

Inventor
JAMES E. WARD

BY Mueller, Aichele and Rauner
Attys.

United States Patent Office 3,452,162

Patented June 24, 1969

3,452,162

CIRCUIT FOR PROVIDING A FILTERED DC POTENTIAL AND AN ACTUATING PULSE FOR AN ELECTROMAGNETIC DEVICE

James E. Ward, Downers Grove, Ill., assignor to Motorola, Inc., Franklin Park, Ill., a corporation of Illinois Filed June 15, 1967, Ser. No. 646,372

Int. Cl. G11b 5/44

U.S. Cl. 179—100.2 6 Claims

ABSTRACT OF THE DISCLOSURE

A filter circuit for filtering the output of a rectifier incorporates an energizing coil, used to operate an electromagnetic device, and a capacitor as filter elements. A switch connects the capacitor across the energizing coil to provide a pulse of energy to actuate the coil.

*Background of the invention*

In certain electronic apparatus one or more portions require a limited amount of power continuously and other portions require a large amount of power intermittently. An example of such a device may be a tape player which uses a multi-track stereo tape cartridge. During most of the operating cycle of such a tape player the power consumption is low. However, when it is necessary to position the tape head adjacent different tracks on the tape an electromagnetic device, which requires a large amount of power, is actuated for a short duration of time. Since the power supply must be capable of producing the maximum power required, the power supply is much larger and more expensive than would be required for operation of the tape player when it is only reproducing the signals stored on the tape.

A smaller power supply can be used if an energy storing circuit is provided which can receive energy during the low power operating periods of device and which can deliver the stored energy to the electromagnetic device as required. However, an energy storage circuit increases the expense and size of the electronic device and requires extra components.

*Summary of the invention*

It is, therefore, an object of this invention to provide an improved energy storage circuit which provides a high power actuating pulse for an electromagnetic device.

Another object of this invention is to provide an energy storage circuit which provides a high power actuating pulse for an electromagnetic device and which also provides filtering for the DC potential from the power supply.

In practicing this invention a circuit is provided for filtering the DC output of a rectifier circuit to deliver substantially pure direct current to utilization stages. The filtering circuit includes an energizing coil for an electromagnetic device, such as a solenoid, and a capacitor for storing energy. The capacitor and the energizing coil form a filter network for reducing the ripple voltage on the DC potential. A switch is provided for connecting the capacitor across the energizing coil as desired. With the capacitor connected across the energizing coil the energy stored in the capacitor is sufficient to operate the electromagnetic device.

The invention is shown in the drawings in which.

*Description of the invention*

Figure 1:
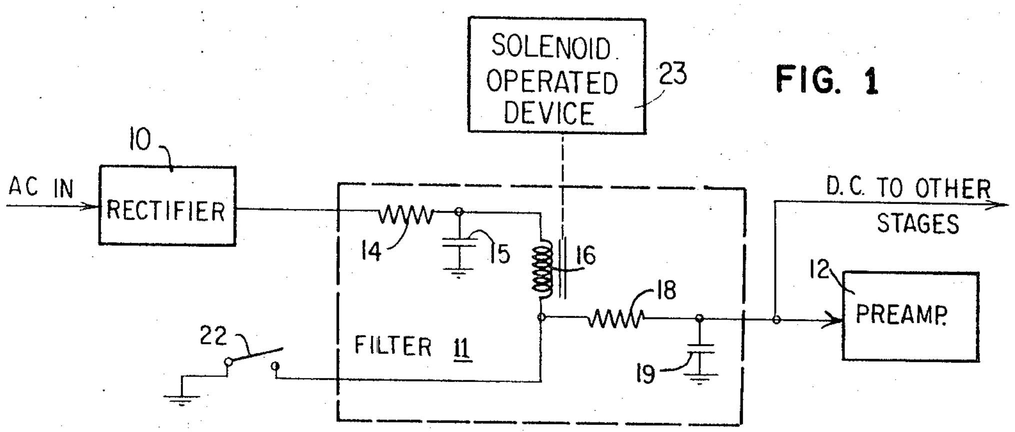
FIG. 1 is a partial schematic and partial block diagram of a circuit incorporating the features of this invention.

Referring to FIG. 1, a rectifier circuit 10 receives AC power which is rectified to form a DC potential having a ripple voltage thereon. Filter circuit 11 couples the DC potential to pre-amplifier 12 and to other electronic stages as desired. Filter 11 acts to reduce the ripple voltage as required by the stages using the DC potential.

Filter 11 includes a filter stage consisting of resistor 14, capacitor 15 and inductance 16. Inductance 16 can be the energizing coil for a solenoid operated device 23. Additional filtering, provided by resistor 18 and capacitor 19, may be included as required.

Figure 2:
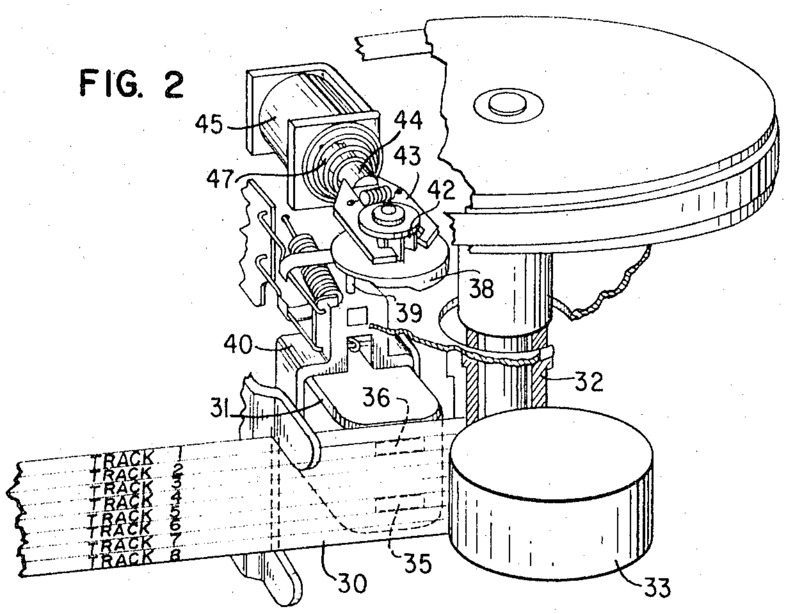
FIG. 2 is a view of the tape player mechanism.

FIG. 2 shows a tape drive and head positioning mechanism for use in a stereo tape player and which incorporates the solenoid operated device 23 of FIG. 1. A tape 30, which may be contained in a tape cartridge, (not shown) is drawn past tape head 31 by means of capstan shaft 32 and pressure roller 33. For example, music may be recorded on the tape on a plurality of parallel tracks in order to make optimum use of the recording capabilities of the tape. In the example shown the tape has eight tracks and since the system is a stereo system, the music on two tracks is played back simultaneously to produce the stereo effect.

The tape head 31 contains a pair of magnetic pickups 35 and 36 which are positioned opposite different tracks. In this example magnetic pickup 35 is positioned opposite track 6 and magnetic pickup 36 is positioned opposite track 2.

In order to play back the music recorded on the other tracks of tape 30 it is necessary to position tape head 31 so that magnetic pickups 35 and 36 are opposite different tracks, for example, track 1 and track 5 or track 3 and track 7. To do this tape head 31 is moved up and down by means of head positioning cam 38 which moves transfer pin 39 up and down. Transfer pin 39 is fastened to the tape head supporting structure 40 so that the upward and downward movement of transfer pin 39 acts to move the tape head 31 up and down.

Head positioning cam 38 includes ratchet 42 driven by a pawl 43. Pawl 43 is connected to a solenoid plunger 44 positioned within solenoid coil 45. Energization of solenoid coil 45 centers plunger 44 within coil 45 causing pawl 43 to move ratchet 42 and head positioning cam 39 and also to compress return spring 47. De-energization of solenoid 45 permits return spring 47 to return pawl 43 to its normal position causing a further movement of ratchet 42 and head positioning cam 39.

Solenoid 45 is actuated automatically at the end of each track to reposition magnetic pickups 35 and 36 to the next track. Solenoid 45 can also be actuated manually to change the position of the magnetic pickups with respect to the tracks as desired. The power required for actuation of solenoid 45 is greater than that required for normal operation of the tape player mechanism including the electronic circuits. Thus the tape player power supply must be large enough to provide the extra power needed by solenoid 45 or some storage means must be provided for storing the extra power needed for actuation of this solenoid.

Referring again to FIG. 1, in normal operation filter circuit 11 provides a filtered DC current to preamplifier 12 through coil 16. However, the current flow through energizing coil 16 is not sufficient to operate solenoid 23. Also during normal operation, the filtering action of filter 11 causes energy to be stored in capacitor 15. Switch 22 can be actuated to connect capacitor 15 across energizing coil 16 to apply the energy stored in capacitor 15 to the energizing coil. The additional current flow through energizing coil 16, provided by the energy stored in capacitor 15, is sufficient to operate slenoid 23 to perform the mechanical operations required.

Figure 3:
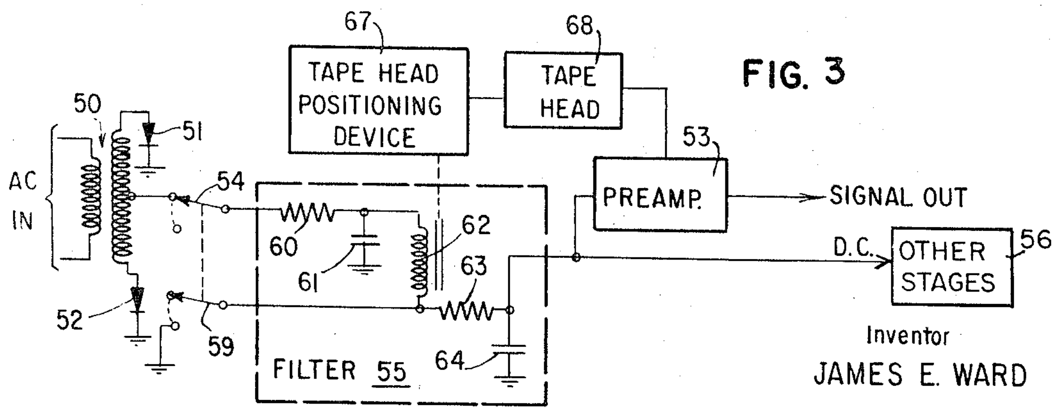
FIG. 3 is a partial schematic and partial block diagram of another embodiment of the circuit shown in FIG. 1.

In FIG. 3 there is shown another embodiment of this circuit. An AC potential supplied to transformer 50 is coupled to rectifiers 51 and 52 to provide a DC output potential having a ripple voltage thereon. DC output potential is coupled to a preamplifier 53 by filter 55 and switch 54. A tape head 68 may be provided for reading magnetic signals stored on a tape and converting the same to electrical signals for amplification by preamplifier 53. Th DC potential from filter 55 may also be supplied to other stages 56 of the tape player as required.

In order to play a multi-track tape, tape head 68 must be positioned opposite the desired track. This is accomplished by tape head positioning mechanism 67 which is operated by solenoid energizing coil 62. Energizing coil 62 together with capacitor 61 and resistor 60 form a part of filter circuit 55. Additional filtering provided by resistor 63 and capacitor 64 may be used as required. Thus the DC potential from transformer 50 and rectifiers 51 and 52 is filtered by filter 35 to provide a filtered DC current for preamplifier 53.

In normal operation the DC current flowing through energizing coil 62 is not sufficient to actuate the tape head positioning mechanism. During the filtering action of filter 55 energy is stored in capacitor 61. When it is desired to actuate tape head positioning mechanism 67, switches 54 and 59, mechanically coupled together, are moved to the second position. In the second position transformer 50 is disconnected from filter 55 by switch 54 and capacitor 61 is connected across energizing coil 62 by switch 59. The energy stored in capacitor 61 is sufficient to energize the tape head transfer mechanism 67 to position tape head 68 is desired. With switches 54 and 59 returned to position one filter 55 again supplies current to the preamplifier 53 and other stages and through the filtering action of filter 55, energy is again stored in capacitor 61. In circuits of this type which have been constructed it has been found that sufficient energy to energize coil 62 can be stored in capacitor 61 in ¾ of a second. However, the invention is not limited to a circuit having this time constant.

Thus a circuit has been shown which provides both a filtered DC potential and an actuating pulse for an electro-magnetic device. By combining the two functions the number of components and the cost of the circuit is reduced. Further a smaller, more efficient and less expensive power supply can be used.

I claim:

1. A circuit for providing a filtered DC potential from an AC potential and an actuating pulse for an electromagnetic device, including in combination, rectifying means adapted to receive the AC potential and providing therefrom a DC potential having a ripple voltage thereon, the electromagnetic device having an energizing coil with an output terminal adapted to be coupled to utilization means and an input terminal, first resistance means coupling said input terminal to said rectifying means, and first capacitor means coupled to one of said input and output terminals, said energizing coil, said first resistance means and said first capacitor means forming a first filter network for reducing the magnitude of said ripple voltage at said output terminal whereby energy is stored in said first capacitor means, switch means coupled to said first capacitor means and the other of said input and output terminals, actuation of said switch means acting to couple said first capacitor means across said energizing coil whereby said energy stored in said first capacitor means actuates said energizing coil.

2. The circuit of claim 1 and further including utilization means, circuit means coupling said output terminal to said utilization means, said circuit means including second resistance means and second capacitor means coupled to form a second filter network for further reducing the magnitude of said ripple voltage.

3. The circuit of claim 2 wherein, said electromagnetic device is a solenoid with said energizing coil forming a portion of said solenoid.

4. In a tape player adapted to be powered from an AC potential and having a multi-track stereo tape and a stereo tape head with an electromagnetically actuated cam mechanism mechanically coupled to the tape head for locating the tape head opposite desired tracks on the tape, the combination including, rectifying means adapted to receive the AC potential and providing therefrom a DC potential having a ripple voltage thereon, the electromagnetically actuated cam mechanism including an energizing coil with an output terminal and an input terminal, first resistance means coupling said input terminal to said rectifying means, and first capacitor means coupled to said input terminal, utilization means, circuit means coupling said output terminal to said utilization means for applying said DC potential thereto, said energizing coil, said first resistance means and said first capacitor means forming a filter network for reducing the magnitude of said ripple voltage, whereby energy is stored in said first capacitor means, switch means coupled to said first capacitor means and said output terminal, actuation of said switch means acting to couple said first capacitor means across said energizing coil whereby said energy stored in said first capacitor means actuates said energizing coil.

5. The circuit of claim 4 wherein, said circuit means includes second resistance means and second capacitance means for further reducing the magnitude of said ripple voltage.

6. The circuit of claim 5 wherein, said electromagnetically actuated cam mechanism includes a solenoid for operating the cam mechanism with said energizing coil forming a portion of said solenoid.

References Cited

UNITED STATES PATENTS

| | | | |
|---|---|---|---|
| 2,418,114 | 4/1947 | Frankel | 333—79 |
| 2,862,781 | 12/1958 | Baumeister | 179—100.2 |
| 3,140,428 | 7/1964 | Shepard | 317—151 |
| 3,177,298 | 4/1965 | Bodoh et al. | 179—100.2 |
| 3,248,633 | 4/1966 | Guarrera | 317—151 |
| 3,267,337 | 8/1966 | Doyle et al. | 317—151 |
| 3,300,740 | 1/1967 | Herzog | 333—79 |
| 3,305,240 | 2/1967 | Missriegler | 179—100.2 |
| 3,388,911 | 6/1968 | Wilson et al. | 179—100.2 |
| 3,391,307 | 7/1968 | Stock | 317—151 |

BERNARD KONICK, *Primary Examiner.*

J. P. MULLINS, *Assistant Examiner.*

U.S. Cl. X.R.

317—151; 333—79